B. PICKERING.
Carbureter.
No. 60,417.
Patented Dec. 11, 1866.
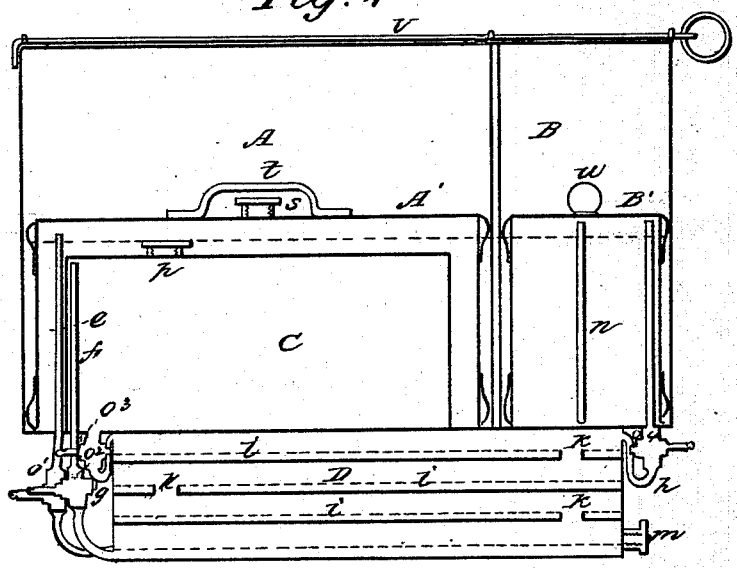
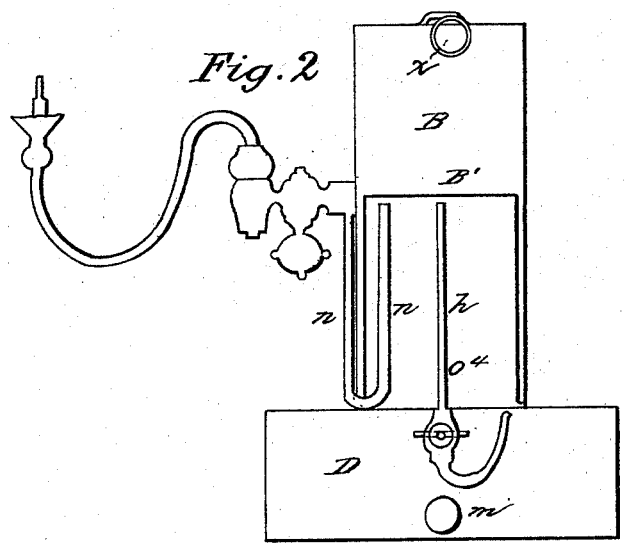
Witnesses:
W. J. Mast
John Stevens
Inventor:
Barton Pickering

United States Patent Office.

IMPROVED APPARATUS FOR CHARGING AIR WITH GASOLINE.

BARTON PICKERING, OF MILTON, OHIO.

Letters Patent No. 60,417, dated December 11, 1866.

*The Schedule referred to in these Letters Patent and making part of the same.*

TO ALL WHOM IT MAY CONCERN:

Be it known that I, BARTON PICKERING, of Milton, in the county of Miami, in the State of Ohio, have invented a new and improved machine for Generating Gas from Gasoline (a fluid distilled from petroleum oil); and I do hereby declare that the following is a full and exact description thereof, reference being had to the accompanying drawings, and to the letters of reference marked thereon.

The nature of my invention consists in the construction of a generating vessel of suitable material, having an extended surface exposed to the air, to which is supplied regularly the gasoline to be converted to gas; also in supplying the requisite amount of air by an air receiver, it being weighted sufficiently to keep the gas receiver filled.

To enable others skilled in the art to make and use my invention, I will proceed to describe its construction and operation.

Figure 1 represents a side view of the machine showing sectional parts of the same.

Figure 2 represents a sectional view of the gas receiver and the end of the generating vessel.

Similar letters of reference on the different figures represent like parts.

A represents a round vessel containing water, when in use, to the height of the red dotted lines. A' represents a receiving vessel for air, resting within the vessel A, and having guides to hold it in position, and having the lower end immersed in the water which is supplied through the orifice closed by the thumb-screw $s$, and when supplied with air by its weight, forces the air through the tube $e$, to the generating vessel D. The tube $e$ has a stop-cock, $o^1$, to close it. $t$ represents a handle by which the vessel is raised. B B' represents a receiving vessel for gas, being similar in construction to the vessels A A'. The gas is received from the generating vessel D, through the tube $h$, which has a stop-cock, $o^4$. $n$ represents a part of tube through which the gas passes to the burner. $n$, fig. 2, represents the entire tube, and shows its connection with an ordinary burner. $u$ represents handle to raise the vessel B'. C represents an air-tight vessel to contain gasoline, having an orifice closed by the thumb-screw $p$, through which it is supplied. This vessel supplies the generating vessel D, through the tube $g$, this tube having a stop-cock, $o^3$. The tube $f$ extends from the top of the vessel C, to a point near the bottom of the vessel D. D represents a vessel in which the air unites with the gasoline to form gas. This vessel has a number of partitions which form air-tight compartments. These partitions have orifices at alternate ends, through which the gasoline descends, and through which the air in an opposite direction ascends for the purpose of combining more effectually the air and gasoline. On the partitions $i\,i\,i$, which are soldered ribs on which is placed coarse bagging, rope, or other suitable substance which will take up the gasoline by capillary attraction, and thereby expose it more thoroughly to the action of the atmosphere. The openings $k\,k\,k$ are surrounded by thimbles, raised so that the gasoline will stand on each of the partitions to the height indicated by the red dotted lines. This vessel is connected to the vessel C by the tube $f$, to the vessel A' by the tube $e$, and to the vessel B' by the tube $h$. $m$ represents a thumb-screw by which the gasoline is drawn from the machine. $v$ represents a bar with a ring, $x$, to hold it in position, the bar passing through openings attached to the receiving vessels, and by which the vessels A' and B' are prevented from raising out of position. The several vessels may be constructed of tin, iron, brass, or copper, of any desirable form and size, only taking care to preserve substantially the same relations of the several tubes to each of the separate vessels.

The mode of charging and operating the machine is thus described: The bar $v$ is first removed, and then the receiving vessels A' B' are taken out. The stop-cocks $o^1\,o^2\,o^3\,o^4$ should all be closed. The thumb-screw $p$ should be withdrawn and the vessel C filled with gasoline; then return the air receiver A' to its position, and likewise the gas receiver B', after filling the vessels A B with water to the red dotted lines. Remove the burner and let the air escape, which is in the gas receiver, and when all the air is out put on the burner. Then open the stop-cocks $o^3\,o^2$; the air will ascend through the tube $f$, and consequently the gasoline will descend through the tube $g$, to the top of the generating vessel D, until the partitions or vessels $i\,i\,i$ are successively filled to the dotted lines; and when the fluid has arisen on the bottom to cover the tube $f$, the flow ceases, because there is no longer a supply of mixed air or gas for the vessel C. When a sufficient portion of gasoline is consumed the air again passes to the supply vessel, and a further supply is obtained; thus a uniform supply of gasoline is secured to the generating surfaces. The stop-cocks $o^1\,o^4$ are then opened, the air from the vessel A' is forced through the tube $e$ to the bottom of the vessel D, where it passes alternately to and fro, forming gas as it ascends over the surface of gasoline, and as the gas is formed it passes into the receiver B′, and from the receiver through the tube $n$, fig. 2, to the burner.

Having fully described the construction and operation of my gas machine, what I claim as new, and desire to secure by Letters Patent, is—

1. I claim the tube $o^2$, to supply mixed air or gas to the vessel C, from the vessel D, connected substantially as described, for the purpose set forth.

2. I claim the supply tube $o^3$, connecting the vessels C and D, substantially as described, and for the purpose set forth.

3. I claim arranging the supply vessel C within the vessel A, substantially as described.

4. I claim the construction of the generating vessel D, with the partitions $i\ i\ i$, having bagging or other suitable material on these surfaces; the orifices $k\ k\ k$, giving an alternating direction to each, the air and gasoline, as described, and for the purposes set forth.

5. I claim the vessels A and A′, vessels B and B′, the vessel C, the vessel D; the tubes $e\ f\ g\ h\ n$, the stopcocks $o^1\ o^2\ o^3\ o^4$, the whole being constructed and combined substantially for the purposes set forth.

BARTON PICKERING.

Witnesses:
    W. J. MAST,
    JOHN STEVENS.